Feb. 13, 1945.　　　　C. R. DALE　　　　2,369,284
RECORD REPRODUCING DEVICE
Filed Feb. 18, 1944　　　3 Sheets-Sheet 1

INVENTOR.
CLARENCE R. DALE,
BY
ATTORNEY.

Feb. 13, 1945.   C. R. DALE   2,369,284
RECORD REPRODUCING DEVICE
Filed Feb. 18, 1944   3 Sheets-Sheet 2

INVENTOR.
CLARENCE R. DALE,
BY
ATTORNEY.

Feb. 13, 1945.   C. R. DALE   2,369,284
RECORD REPRODUCING DEVICE
Filed Feb. 18, 1944   3 Sheets-Sheet 3

INVENTOR.
CLARENCE R. DALE,
BY
ATTORNEY.

Patented Feb. 13, 1945

2,369,284

UNITED STATES PATENT OFFICE 2,369,284

RECORD REPRODUCING DEVICE

Clarence R. Dale, Altadena, Calif., assignor of thirteen and three-fourths per cent to J. R. Pemberton and forty-five per cent to Technical Oil Tool Corporation, Ltd., Los Angeles, Calif., a corporation of California Application February 18, 1944, Serial No. 522,905

6 Claims. (Cl. 33—20)

My invention relates to a curve drawing apparatus and has particular reference to a device for reproducing in accurate enlarged curve form the data represented by the records of automatic recording instruments.

In many types of engineering work recourse is had to curves or graphs in connection with engineering data for the purpose of facilitating the calculation of certain results indicated by that data or for the purpose of interpreting and representing the results shown by the data. For example, it is the common practice in the oil producing industry to lower into an oil well bore a self-contained recording instrument which operates to record the magnitude of certain conditions existing within the well bore such as pressure, temperature or geologic structure and to record those conditions in relation to the depth at which the condition is measured or, alternatively, the time elapsed from the starting of the instrument into the well bore. By necessity, the records obtained are small in size and require calculation or interpretation in order to present an accurate and readily understandable log of the conditions existing within the well bore in terms of the distance below the ground surface.

Prior to my invention it was the common practice to reduce such engineering data to curve form by first interpreting the record and reducing the observed magnitudes to mathematical quantities. These quantities were then plotted as points on coordinate paper and a curve was drawn through the plotted points. This method has the disadvantage of consuming an inordinate amount of time, and because of the complex nature of the data reduction and the number of steps involved, provides many opportunities for the introduction of errors into the results. Furthermore, the curve is actually undetermined between the plotted points, and to determine the curve shape with reasonable accuracy particularly where the curve is not a regular function, requires the plotting of an inordinate number of individual points.

It is, therefore, an object of my invention to provide an apparatus which overcomes the above noted disadvantages by providing a means for directly drawing enlarged curves from automatic instrument records.

It is also an object of my invention to provide apparatus of the character set forth in the preceding paragraph which includes a means for projecting on a curve sheet an enlarged image of the instrument record to permit the image to be traced on the curve sheet as the desired curve.

It is an additional object of my invention to provide an apparatus of the character set forth in the preceding paragraphs which is particularly suitable for producing graphs or curves from relatively long instrument records and which includes a projection means for projecting on an elongated curve sheet an enlarged image of a portion of the instrument record and which includes also means for moving the curve sheet and the image in synchronism past a tracing stylus.

It is a still further object of my invention to provide an apparatus of the character set forth in the preceding paragraph which includes a means for moving the tracing stylus laterally with respect to the motion of the curve sheet and image to thereby facilitate the operation of tracing the curve on the curve sheet.

It is also an object of my invention to provide in an apparatus of the character set forth hereinbefore a means for adjusting the size of the projected image to permit fitting the curve to the coordinate system printed on the curve sheet.

It is an additional object of my invention to provide in an apparatus of the character set forth in the preceding paragraphs a means for moving the curve sheet laterally with respect to the image motion to provide for lateral registration of the curve with the coordinate system printed on the curve sheet.

It is additionally an object of my invention to provide in an apparatus of the character described hereinbefore a means for drawing on a curve sheet a single continuous curve representing the magnitude changes involved in an instrument record extending over a number of ranges of magnitudes.

Other objects and advantages of my invention will be apparent from a study of the following specifications, read in connection with the accompanying drawings, wherein.

Figures 1, 2, 3:
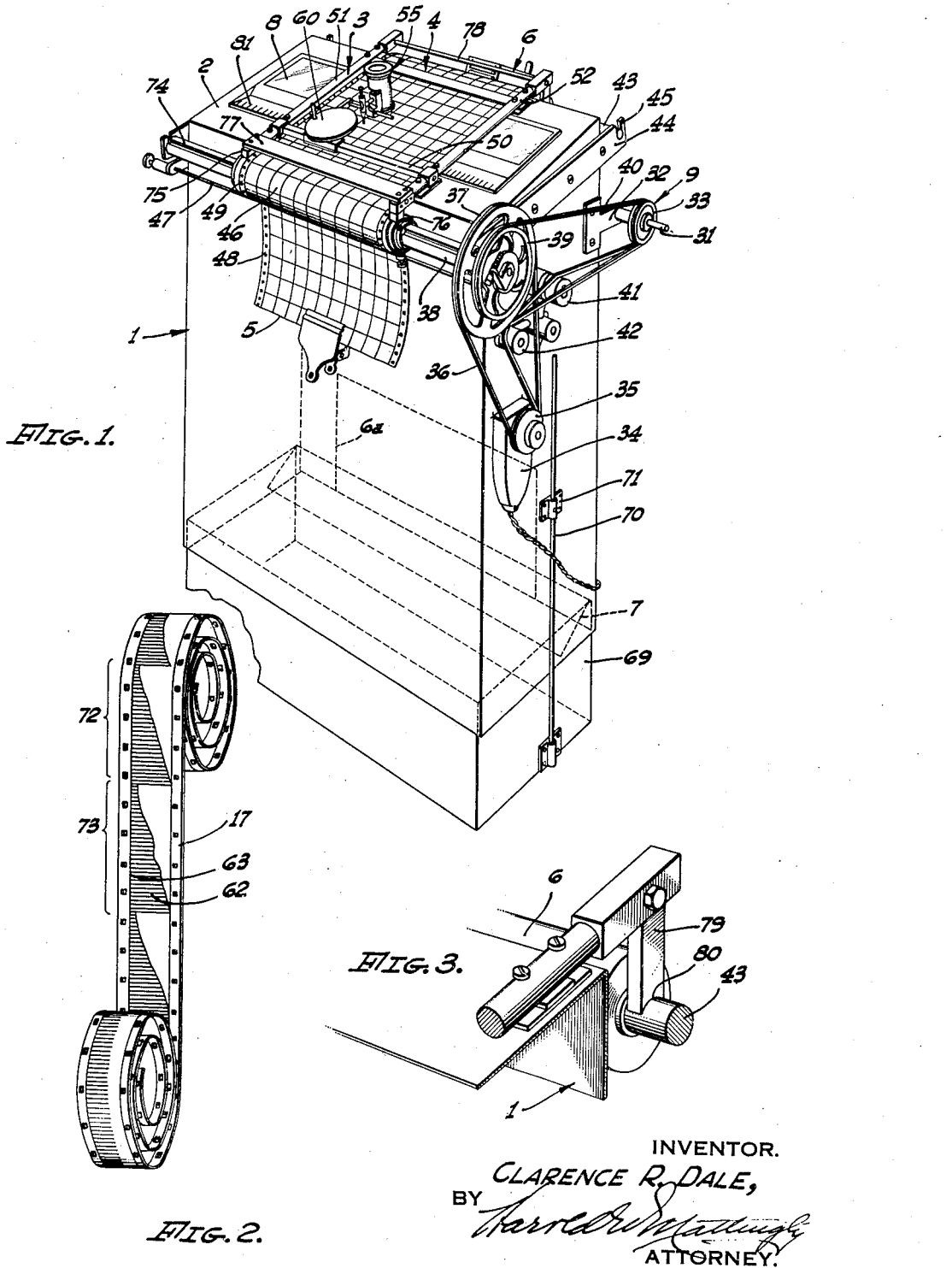
Fig. 1 is a perspective view illustrating the form, appearance and general construction of the preferred form of the apparatus of my invention.
Fig. 2 is a perspective view illustrating a type of instrument record which the apparatus of my invention is particularly capable of reproducing.
Fig. 3 is a fragmentary perspective view illustrating the details of construction of a means used to support a supply of graph paper.

Referring to the drawings, I have illustrated in Fig. 1 the preferred embodiment of my invention as comprising an upright housing 1 provided preferably with a sloping top 2 defining a working or operating surface. The housing 1 mounts a carriage 3 which supports a supply 4 of graph paper 5 or other suitable medium upon which the curve is to be drawn. Behind the housing 1 there is mounted a projection apparatus 6 which projects through an opening 6a upon an inclined mirror 7 mounted in the lower portion of the housing 1 and on to a glass top 8 mounted in the upper surface 2 of the housing 1 an enlarged image of the instrument record which may be mounted in the projection apparatus 6. The device includes a drive mechanism indicated generally at 9 which operates to simultaneously advance the instrument record through the projection apparatus 6 and the graph paper 5 over the glass top 8 to permit the reproduction of relatively long records.

Figure 4:
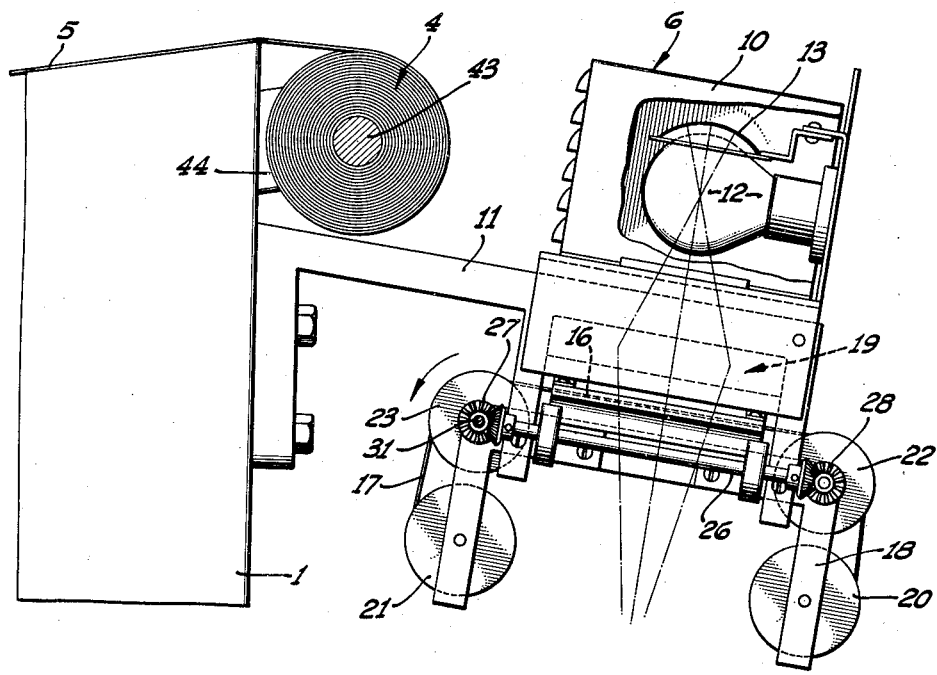
Fig. 4 is a fragmentary elevational view with parts shown in section and illustrating the image projection portion of the apparatus.
Figure 5:
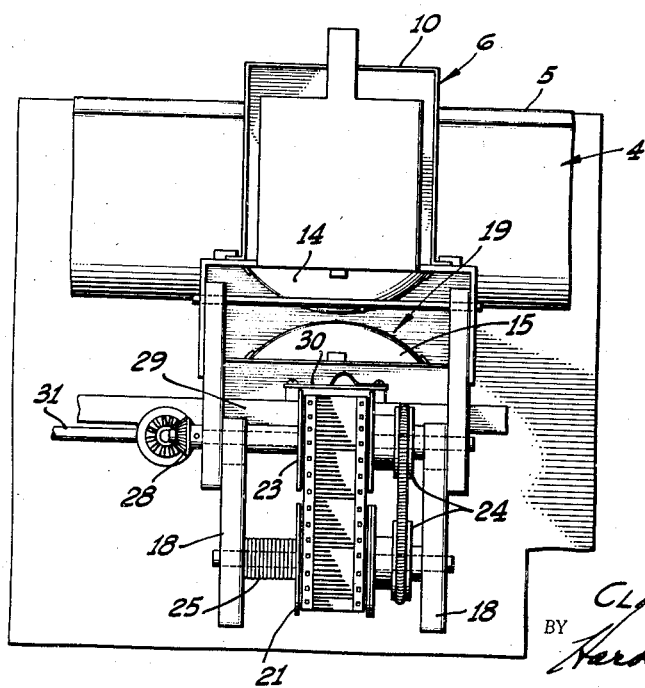
Fig. 5 is an end elevational view of the apparatus shown in side elevation in Fig. 4.

As is best shown in Figs. 4 and 5, the projection apparatus 6 comprises a lamp housing 10 mounted upon a rearwardly extending bracket 11 secured to the housing 1 and enclosing a light source such as an incandescent lamp 12. The housing 10 may enclose a reflector 13 arranged to direct the light from the lamp 12 through lenses 14 and 15 and through a section 16 of a record strip 17 to project an image of the record portion 16 on to the inclined mirror 7 and be reflected from there on to the glass top 8.

I have chosen for illustration as the preferred embodiment of my invention the curve drawing apparatus which is adapted particularly to receive instrument records 17 recorded upon a 16 millimeter or 35 millimeter motion picture film. In Fig. 2 I have illustrated in perspective a record 17 of the general type referred to.

Accordingly the frame 18 rotatably supports a supply reel 20 and a take up reel 21 together with drive sprockets 22 and 23. The take up reel 21 is drivably connected to the sprocket 23 as by means of a belt and pulley arrangement 24 operating through a friction clutch 25 to overdrive the take up reel 21 in the conventional manner to thereby rewind the record strip 17 as fast as it is fed from the sprockets 22 and 23 and the supply reel 20.

The sprockets 22 and 23 are drivably interconnected by means of a cross shaft 26 and bevel gearing 27, 28. By this means the sprockets 22 and 23 are maintained synchronized at all times. The record 17 in passing over the sprocket 22 extends across an aperture plate 29 and is held in spring contact therewith by means of a pressure plate 30.

By preference the sprockets 22 and 23 are power driven and for this reason the bevel gearing 27 is connected to a longitudinal shaft 31 which is journaled as shown at 32 in Fig. 1 and which carries on its end a drive pulley 33.

Power for rotating the shaft 31 is obtained from a suitable source of motive power illustrated in Fig. 1 as comprising a small electric motor 34. The motor 34 may support a pulley 35 which is drivably connected as by means of a belt 36 to a larger pulley 37 mounted upon a drive shaft 38. The pulley 37 also includes a pulley portion 39 which is connected as by means of a belt 40 to the aforementioned pulley 33, thus transmitting motion of the motor pulley 35 to the shaft 31 to slowly advance the record strip 17 through the projection apparatus 6. A suitable operating tension may be maintained in the belts 36 and 40 by means of suitable idlers illustrated at 41 and 42.

The supply or roll of graph paper 4 is preferably mounted loosely upon a shaft 43 extending across the back of the housing 1 and supported by means of end brackets 44 secured to the housing 1 and notched as shown at 45 to receive the shaft 43. The paper strip 5 unrolled from the roll 4 is carried forwardly over the glass top 8 and into engagement with a drive roller 46 carried on the shaft 38 and drivably engaged therewith.

An idler shaft 47 carrying a roller or other suitable means adjacent the drive roller 46 may be used to maintain the paper strip 5 in suitable driving engagement with the roller 46. This driving engagement may, if desired, comprise simply a frictional engagement between the paper and the roller, or preferably as shown in Fig. 1 the paper 5 is provided with perforations or sprocket holes 48 along each edge and the roller 46 is formed as a drive sprocket having drive pins 49 which are received within the perforations 48.

It will be observed that with the arrangement just described, operation of the motor 34 will serve to move the record strip 17 slowly past the projection lens assembly 19 with the result that the image of the record strip which is cast upon the under side of the paper 5 through the glass top 8 will be slowly moved in a direction extended lengthwise of the paper strip 5. At the same time the paper 5 is moved by the drive roller 46 in the same direction and the pulleys 35, 37, 39 and 33 and the diameter of the drive roller 46 and drive sprockets 22 and 23 are so adjusted that the movement of the paper strip 5 is accurately synchronized with the movement of the image with respect to the glass top 8 so that the image which is projected on to the under side of the paper 5 will remain stationary with respect to the paper.

The operation of reducing the data contained on the record strip 17 to a curve drawn on the paper 5 requires a visual observation of the material projected on to the strip 5 and for this reason the paper 5 is selected to have a certain degree of translucency so that when viewed from the upper side the image projected on the under side of the paper will be visible.

Figure 6:
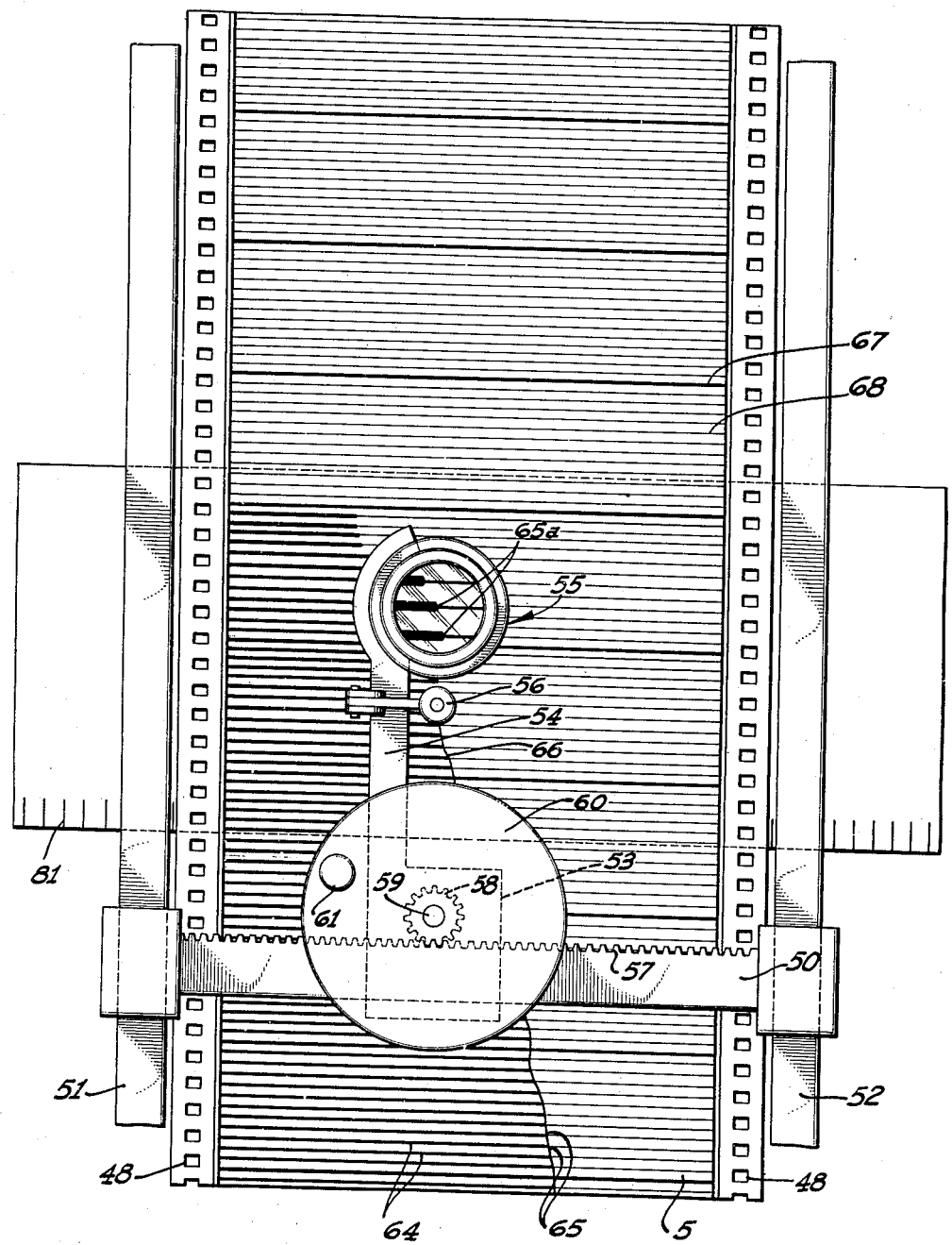
Fig. 6 is an enlarged fragmentary plan view of the top of the apparatus shown in Fig. 1 and illustrating the manner in which the device of my invention operates to produce a curve representing the data carried on a record strip such as that shown in Fig. 2.

The apparatus employed for actually drawing the curve on the paper 5 is illustrated in Fig. 6 as including a guide bar 50 extending transversely of the strip 5 and mounted upon longitudinal supporting bars 51 and 52 extended parallel to the strip 5. Upon the bar 50 there is slidably mounted a carriage 53 which includes a rearwardly extending arm 54 supporting at its extremity a simple microscope or magnifier 55. At a point closely adjacent the microscope 55 there is mounted a tracing stylus 56 which may comprise a pen, pencil or other suitable marking instrument.

To facilitate controlling the position of the carriage 53 and the stylus 56 transversely of the paper 5, the guide bar 50 is toothed as shown at 57 to define a gear rack engaging a drive pinion 58 mounted upon a vertical shaft 59 journaled in the carriage 53. The upper end of the shaft 59 mounts a handwheel 60 which may be provided with a convenient handle 61. With this arrangement rotation of the handwheel 60 will effect a translation of the carriage 53 along the guide bar 50 transversely of the length of the record strip 5.

I have shown in Fig. 2 the particular type of instrument record strip 17 with which the illustrated curve drawing apparatus of my invention is intended to be used. The strip 17 comprises a strip of motion picture film upon which is photographically recorded a plurality of closely spaced transversely extending lines 62. The length of the lines 62 as measured from a base or reference line 63 is the measure of the magnitude of the condition measured by the instrument producing the record strip 17. An instrument of the character referred to and a record of the type shown in Fig. 2 are described and claimed in my copending application Serial No. 370,320, filed December 16, 1940 and entitled "Recording instrument for oil wells."

I have shown in Fig. 6 the appearance of the paper strip 5 when the device is in operation, there being visible thereon projected record image lines 64 comprising enlarged images of the record lines 62. These images 64 and particularly that region adjacent the outer ends 65 thereof are further enlarged as shown at 65a by the microscope 55. The microscope 55 thus facilitates the accurate operation of the machine.

In operation the paper 5 with the images 64 projected thereon are moved slowly by the operation of the motor 34 downwardly past the microscope 55 toward the guide bar 50 as viewed in Fig. 6. During this motion an operator so manipulates the handwheel 60 as to maintain the image ends 65a in the center of the field of the microscope 55. Thus the carriage 53 and stylus 56 carried thereby are moved laterally back and forth across the width of the paper strip 5 as the length of the image lines 64 varies, with the result that the stylus 56 draws upon the paper 5 a curve 66 accurately representing the relation between the length of the record lines 62 and their spacing longitudinally of the record strip 17.

The instrument disclosed in my aforementioned copending application operates on a definite time principle so that the record lines 62 are uniformly spaced along the length of the record strip 17 and so that the space between each of the lines represents a definite time interval. In the normal use of that instrument the rate of lowering the instrument into the well bore is so controlled that these definite time intervals represent equally definite depth increments. It is accordingly desirable that the curve 66 be so drawn on the paper 5 as to reproduce with respect to printed lines 67, 68 on the paper 5 the same definite time or depth relation as exists on the record strip 17. This correlation may be obtained by appropriate adjustment of the size of the image which is projected upon the paper strip 4.

Accordingly the housing 1 is provided with a sub-base portion 69 which is telescopically received within the housing 1 and which in turn supports the mirror 7. Standards 70 carried by the sub-base 69 and coacting with suitable clamp members 71 permit the upper part of the housing 1 to be raised and lowered with respect to the sub-base 69 and mirror 7 so as to adjust the size of the image which is projected upon the paper 5.

The record strip 17 which is mounted in the projection apparatus may be of the character shown in Fig. 2 upon which is recorded a plurality of ranges of magnitudes as represented, for example, by the record portions enclosed by the brackets 72 and 73. For example, the values represented by the length of the lines 62 comprising the record portion 72 may extend from zero to a magnitude N. The range included within the portion 73 may extend from a magnitude value of N to a maximum value of 2N. Thus a proper interpretation of the record 17 requires that the quantity N be added to the quantities apparently represented by the lengths of the lines 62 in that portion of the record.

In drawing the curve 66, it is desirable that the curve extend continuously from one range to another to represent the entire magnitude range which is recorded on the record strip 17 instead of presenting a discontinuous curve in which the quantities are illustrated in a plurality of ranges.

This desirable result is accomplished in the apparatus of my invention by mounting the curve drawing apparatus and the paper 5 for lateral movement with respect to the image projected upon the under side of the paper, thus allowing the paper to be placed in one position when a low range portion of the record is being reproduced and moved to a different location to continue the curve in a continuous manner when a higher range portion of the record is being reproduced.

Accordingly the drive shaft 38 is keyed or splined as shown at 74 to receive a key or pin carried by the drive roller 46 and serving to provide a driving engagement between the shaft 38 and the roller 46 while permitting the rollers 46 to be slid axially along the shaft 38. The roller 46 mounts at its respective ends journals 75 and 76 which may be interconnected by a cross bar 77 and which carry the lower ends of the carriage bars 51 and 52.

The carriage bars 51 and 52 are joined by a rear transverse bar 78 and each carries a downwardly depending support arm such as that shown at 79 in Fig. 3. The lower end of the arm 79 is grooved as shown at 80 to rest upon the supporting shaft 43, the parts being so arranged that the arms 79 are positioned immediately adjacent the ends of the roll 6 of curve paper. Thus the assembly just described comprises a carriage which may be slid laterally across the glass top 8 to different positions with respect to the image produced by the projection apparatus. By preference a scale 81 is affixed to the working surface 2 to facilitate locating the carriage in the desired transverse position.

It will be noted also that the carriage assembly just described is pivotally mounted about the shaft 38 by means of the journals 75 and 76 so that the same may be lifted to facilitate the initial threading of the paper strip 5 across the glass top 8 and over the feed roller 46.

From the foregoing it will be observed that I have provided a novel curve drawing apparatus and that this apparatus operates to project upon a moving strip of curve or graph paper an enlarged image of the instrument record to be reproduced and that this image of the record is caused to move at the same speed and in the same direction as the paper is moved so as to cause the image to be stationary with respect to the paper.

It will also be noted that I have provided means for readily drawing on the paper strip a curve representative of the data recorded on the instrument record strip and that means has been included for adjusting the location of the image with respect to the paper so as to insure the proper representation of the values recorded on the instrument's record.

While I have shown and described the preferred embodiment of my invention, I do not desire to be limited to any of the details of construction shown or described herein, except as defined in the appended claims.

I claim:

1. In an apparatus for reproducing in enlarged curve form the data carried on a record strip of the type wherein an indicated location on said strip represents the relation between two recorded magnitudes, the combination of: support means for holding a sheet upon which said curve is to be drawn; projection means for projecting upon said sheet an enlarged image of said strip; means for moving said strip past said projection means at a uniform rate, whereby said image moves relative to said support at a greater rate; means for moving said sheet relative to said support in the same direction and at the same rate as said image; a tracing stylus engaging said sheet for drawing a curve thereon; and means mounting said stylus for movement transversely of the direction of movement of said sheet.

2. In an apparatus for reproducing in enlarged curve form the data carried on a record strip of the type wherein an indicated location on said strip represents the relation between two recorded magnitudes, the combination of: a transparent support for holding a translucent sheet upon which said curve is to be drawn; projection means for projecting upon the under surface of said sheet an enlarged image of said strip; means for moving said strip past said projection means at a uniform rate, whereby said image moves relative to said support at a greater rate; means for moving said sheet relative to said support in the same direction and at the same rate as said image; a tracing stylus engaging the upper side of said sheet for drawing a curve thereon; and means mounting said tracing stylus for movement relative to said sheet transversely of the movement thereof.

3. In an apparatus for reproducing in enlarged curve form the data carried on a record strip of the type wherein an indicated location on said strip represents the relation between two recorded magnitudes, the combination of: a transparent support for holding a translucent sheet upon which said curve is to be drawn; projection means for projecting upon the under surface of said sheet an enlarged image of said strip; means for moving said strip past said projection means at a uniform rate, whereby said image moves relative to said support at a greater rate; means for moving said sheet relative to said support in the same direction and at the same rate as said image; a tracing stylus engaging the upper side of said sheet for drawing a curve thereon; means mounting said tracing stylus for movement relative to said sheet transversely of the movement thereof; and a microscope mounted adjacent said stylus in a position permitting magnified visual observation of said image at a location immediately adjacent the point of engagement of said stylus with said sheet.

4. In an apparatus for reproducing in enlarged curve form the data carried on a record strip of the type wherein an indicated location on said strip represents the relation between two recorded magnitudes, the combination of: a transparent support; a carriage above said support for holding a translucent sheet upon which said curve is to be drawn; projection means for projecting upon the under side of said sheet an enlarged image of said strip; means for moving said strip past said projection means at a uniform rate, whereby said image moves relative to said support at a greater rate; means for moving said sheet relative to said carriage in the same direction and at the same rate as said image; and means mounting said carriage on said support for adjustable movement laterally with respect to the direction of movement of said image.

5. In an apparatus for reproducing in enlarged curve form the data carried on a record strip of the type wherein an indicated location on said strip represents the relation between two recorded magnitudes, the combination of: a rectangular box-like supporting structure having an aperture in the rear face thereof; a transparent top for said frame; a reflector mounted in the lower portion of said frame; projection means mounted at the rear of said frame and directed through said opening toward said reflector for projecting upon the under surface of said transparent top an enlarged image of said strip; a carriage means; means mounting said carriage means on said frame above said top for movement transversely of said top; a means on said carriage for supporting a roll of translucent sheet material upon which said curve is to be drawn; drive means on said carriage for advancing said sheet longitudinally of said top at a predetermined rate; power means on said frame for operating said drive means; and coupling means interconnecting said drive means with said projection means for moving said strip through said projection means at a rate adjusted to move said image in the same direction and at the same rate as said sheet is moved.

6. In an apparatus for reproducing in enlarged curve form the data carried on a record strip of the type wherein an indicated location on said strip represents the relation between two recorded magnitudes, the combination of: a rectangular box-like supporting structure having an aperture in the rear face thereof; a transparent top for said frame; a reflector mounted in the lower portion of said frame; projection means mounted at the rear of said frame and directed through said opening toward said reflector for projecting upon the under surface of said transparent top an enlarged image of said strip; a carriage means; means mounting said carriage means on said frame above said top for movement transversely of said top; a means on said carriage for supporting a roll of translucent sheet material upon which said curve is to be drawn; drive means on said carriage for advancing said sheet longitudinally of said top at a predetermined rate; power means on said frame for operating said drive means; coupling means interconnecting said drive means with said projection means for moving said strip through said projection means at a rate adjusted to move said image in the same direction and at the same rate as said sheet is moved; means on said carriage defining a laterally extending slideway; a tracing stylus mounted on said slideway for lateral movement and bearing on the upper side of said sheet for drawing a curve thereon; and magnifying means mounted adjacent said stylus for permitting magnified visual observation of said image at a location immediately adjacent the point of engagement of said stylus with said paper.

CLARENCE R. DALE.